United States Patent Office 2,907,866
Patented Oct. 6, 1959

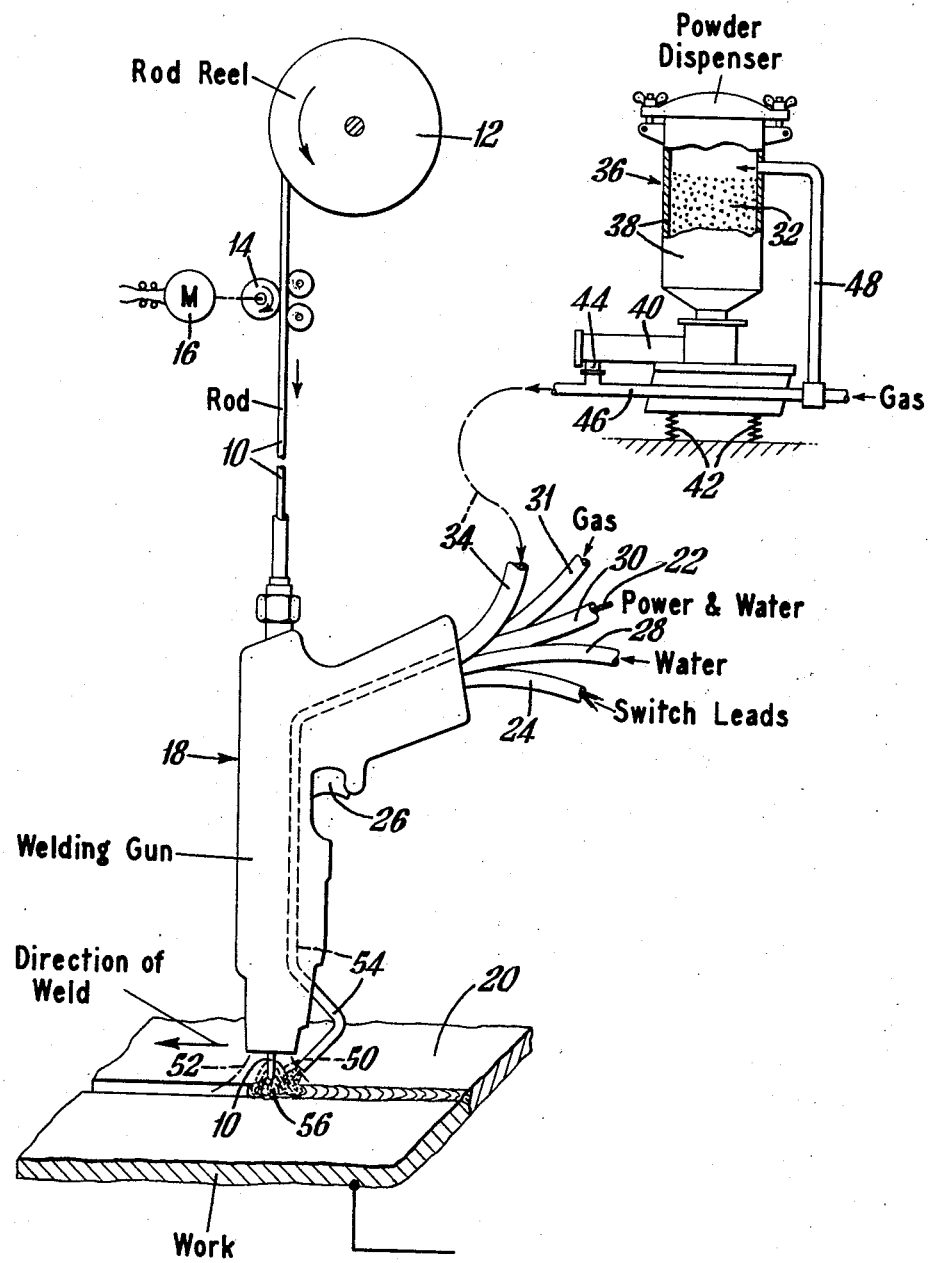

2,907,866

ELECTRIC ARC WELDING OF STEEL

Donald M. Yenni, Williamsville, N.Y., assignor to Union Carbide Corporation, a corporation of New York Application January 16, 1956, Serial No. 559,164

3 Claims. (Cl. 219—74)

The present invention relates to the electric arc welding of steel and, more particularly, to such a welding process employing a consumable electrode metal arc.

It has long been desired to provide a metal arc welding process wherein the electrode rod is continuously fed into the welding zone, wherein a visible arc and welding zone are maintained, and wherein the arc and welding zone can be easily shielded and refined.

One such process employed a continuous bare electrode which was energized and fed into the welding zone under a layer of granulated welding composition which melted and covered the end of the electrode and molten weld metal thus shielding and refining it. This process is referred to as the "submerged melt welding process" and was disclosed and claimed in U.S. Patent No. 2,043,960 to L. T. Jones et al. While this process provided resultant welds of desired physical properties and low cost (particularly for automatic welding), the lack of visibility of the weld puddle limited its use for manual applications.

A number of other processes have been proposed for continuously fed electrode welding. Some of these involved the use of flux-cored electrodes. Others involved coatings so applied as to provide means for introducing current through them to the core wire. All such processes involved a high cost of electrode and difficulty in use for satisfactory welding results.

In an attempt to provide a process which was not limited to downhand position welding and in which the arc and welding zone are visible, the gas shielded metal arc welding process was provided. This process comprised feeding a continuous bare wire electrode into the welding zone while concurrently shielding the arc zone and weld puddle with a gas which is inert to the weld puddle.

It is very difficult to employ such prior gas shielded metal arc welding processes to obtain stable welding conditions when employing a direct-current welding source at straight polarity or an alternating current welding source. The prior gas shielded metal arc welding processes are limited in their effectiveness primarily to the use of only direct current reverse polarity welding sources. It has long been known that higher metal deposition rates (pounds per hour of metal deposited) could be attained in gas shielded metal arc welding with direct current sources at straight polarity if a process could be provided for obtaining arc stability under such conditions.

Another limitation in this process is that, while the arc and weld puddle were properly shielded from atmospheric contamination, the weld puddle cannot effectively be fluxed, refined or alloyed in applications where such is desired without the use of specially treated welding rods which are very costly.

Still further, it is not possible in such prior gas shielded metal arc welding processes to properly protect the deposited metal from exposure to air during final solidification and cooling; large quantities of relatively expensive gases, such as argon, are required; it is not possible to control the weld metal cooling rate and thereby decrease the degree of porosity and improve the mechanical properties; it is not possible to add special alloys other than those present in the electrode; and it is not possible, without the use of specially treated electrode rods, to employ $CO_2$ as a shielding gas without obtaining an excessive amount of spatter.

Accordingly, it is the prime object of the present invention to provide a shielded metal arc welding process wherein the beneficial arc characteristics of shielding gas are maintained and wherein the weld puddle is additionally shielded and, where desired, fluxed, refined, and alloyed.

Another object is to provide such a shielded metal arc welding process capable of efficiently depositing weld metal at a high current density and metal deposition rate to produce a weld of desired strength and low porosity at gas consumption rates appreciably lower than those required in prior gas shielded arc welding processes.

Other aims and advantages of the invention will be apparent from the following description and appended claims.

In accordance with the present invention, a welding process is provided, wherein a steel electrode and workpiece are connected to a source of welding current, comprising feeding the electrode toward the workpiece to establish and maintain an arc and welding zone therebetween; feeding a stream of shielding gas around the arc and welding zone; correlating relative movement between the electrode and workpiece while concurrently introducing a gas-borne stream of granular welding composition into the welding zone immediately behind the arc to flux and refine and further shield the welding zone; and correlating the rate of introduction of the welding composition with the rate of fusion of the electrode.

It has been found that, should granulated welding composition be introduced generally into the welding zone in such a manner that it can pass into the arc plasma, a tendency to cause arc instability is encountered. In addition, that portion of such welding composition falling in front and to the sides of the arc is generally wasted since it does not serve to flux, refine or shield the welding zone. Accordingly, by introducing the granulated welding composition into the welding zone immediately behind the arc, the composition is used most efficiently and does not interfere with the stability of the arc.

Increased metal transfer efficiency, increased arc stability and improved weld bead shape are obtained when the granulated welding composition is introduced into the welding zone behind and as close to the arc as possible, without disturbing the arc plasma. Preferably the stream of such welding composition should be introduced uniformly over the width of the weld bead to uniformly cover the welding zone.

The increased metal transfer efficiency accomplished by the process of the present invention over those obtained in the prior gas shielded metal arc welding processes is particularly significant.

Prior straight polarity sigma welding processes in which the electrode is negative have not been very practical for "position" welding due to low metal transfer efficiency, uneven metal transfer, arc instability and high filler wire consumption. These disadvantages have been partially overcome by the addition of oxygen to pure argon shielding gas (argon containing 5% $O_2$, for example). The metal transfer can be increased about 30% and the arc stability can be improved in this manner.

By employing the process of the invention to introduce granulated welding composition behind the arc, the metal transfer efficiency under straight polarity welding conditions has been increased 80% over that obtained in the conventional prior gas shielded metal arc welding process employing otherwise similar welding conditions. A significantly high increase in metal transfer efficiency is also obtained under reverse polarity conditions by the process of the present invention.

The single figure of the drawing shows schematically apparatus suitable for practicing the process of the invention. As there shown, a steel welding rod or wire 10 is drawn from a rod reel 12 by rod feed control means 14, driven by a variable speed motor 16, and fed through a welding gun 18 toward a workpiece 20. A power cable 22 passes into gun 18 where it energizes rod 10, while a similar cable (not shown) is connected to workpiece 20 to complete the electric welding circuit. Switch cable 24 is connected through trigger 26 of welding gun 18 and controls the energization of the welding circuit. Cooling water circulation is provided within gun 18 through inlet conduit 28 and outlet conduit 30 surrounding power cable 22. The arc and welding zones are shielded with a stream of gas introduced into the gun through conduit 31 and discharged concentrically around the electrode. Powdered granulated material 32 is carried to welding gun 18 in a gas stream through conduit 34. The powder is suspended in the carrier gas stream in powder dispenser 36 comprising a closed hopper 38 in which powder 32 is stored. Shelf 40 is electrically vibrated on springs 42, thereby conveying powder through conduit 44 to the carrier gas stream passing through conduit 46 which communicates with conduit 34 of welding gun 18. Pressure equalization of the hopper above the powder charge 32 is accomplished through conduit 48 of dispenser 36. Such dispenser is of the type disclosed and claimed in U.S. Patent No. 2,533,331 issued on December 12, 1950 to G. M. Skinner.

As the rod 10 is touched to the workpiece 20 to initiate arc 50 and begin the welding operation, shielding gas is discharged from the nozzle around rod 10 to form a shielding gas envelope 52 around the arc. Powder introduced into the welding gun 18 through conduit 34 passes through conduit 54 within the welding gun and is discharged into the welding zone 56 at a point immediately behind the arc (opposite side of arc from direction of weld) and forms a layer of molten slag protecting the welding zone.

In an example of the process of the invention, apparatus of the type shown in the drawing was employed to weld steel with a 1/16-inch diameter #32 CMS steel wire and a shielding gas mixture of 95% argon-5% oxygen. Powdered granulated welding composition was suspended in a 3 cubic ft. per hour stream of carrier gas, of the same composition as the shielding gas employed, and was introduced through a 1/4-inch outside diameter tube into the welding zone at a point immediately behind the arc which was shielded with a 25 cu. ft. per hour flow of 95% argon-5% oxygen stream. A single-pass bead was applied at 360 amperes and 27 volts DCRP and the resultant arc was stable and the bead obtained was smooth and well formed.

In another example of the process of the invention, similar apparatus was employed to weld steel using 3/64 inch diameter #32 CMS steel welding wire. The shielding gas employed consisted of 95% argon-5% oxygen and the shielding gas feed rate was 40 cubic ft. per hour. Powdered granulated welding composition was suspended in a carrier gas stream of the same composition as the shielding gas, and the fluidized powder was introduced into the welding zone at a point immediately behind the arc through a 1/4-inch outside diameter tube at a gas flow rate of 15 cubic ft. per hour and a powder flow rate of 10 pounds per hour. A single-pass bead was applied at 185 amperes and 30 volts D.C.S.P. in a vertical position operation. Under these conditions, photographs taken at 10,000 frames per second enabled observation of the action which demonstrated arc stability under the welding conditions.

The following table sets forth data for D.C. straight polarity vertical up welding of steel for three welding operations employing the process of the present invention and for three welding operations employing the prior conventional gas shielding metal arc welding process.

Table

| Amp. | Volts | Shielding Gas | Gas Rate, C.f.h. | Additive | Metal Transfer Efficiency,[1] percent |
| --- | --- | --- | --- | --- | --- |
| 190 | 28 | A | 40 | Welding Comp. | 60 |
| 185 | 30 | 95%A-5%O₂ | 40 | ---do--- | 80 |
| 200 | 33 | He | 60 | ---do--- | 95 |
| 275 | 30 | A | 40 | None | 0 |
| 265 | 31 | 95%A-5%O₂ | 40 | ---do--- | 30 |
| 250 | 36 | He | 60 | ---do--- | 0 |

Note.—Welding composition added at 10 lb./hr. .064-inch diam. No 32 CMS wire used.
[1] Metal transfer efficiency represents percentage of transferred metal reaching plate.

As may be seen from the above table, the introduction of granulated welding composition into the welding zone at a point immediately behind the arc in accordance with the process of the invention increased the percentage of electrode metal transfer to the work from a value between 0–30% to a value between 60–95% for similar shielding gas compositions and flow rates.

It is to be understood that the powdered granulated welding compositions employed in the process of the invention can comprise any suitable granulated solid welding composition similar to the silicate-containing type used in the solid composition-shielded submerged melt welding art. Deoxidizers or other weld modifying alloying agents may be added to the welding compositions, as desired.

Welding compositions used in the solid composition-shielded arc welding art ordinarily comprise, as their principal ingredients a silicate-containing slag-producing component capable of forming a protective molten layer for shielding and shaping the weld puddle, and a metal halide component which serves to impart electrical conductivity to the slag formed from the slag-producing component of the welding composition. Some of the compounds which have been successfully employed in the slag-producing component are as follows: titanium dioxide, manganous oxide, ferrous oxide, silica (as a silicate in combination with at least one of the oxides here listed), calcium oxide, magnesium oxide, zirconia, potassium oxide, sodium oxide, lithium oxide, barium oxide and strontium oxide. Some of the halides which have been successfully employed as the conductivity-imparting component are as follows: sodium aluminum fluoride, potassium silicon fluoride, calcium fluoride and calcium titanium fluoride. It is also often desirable to include in the welding composition components which are transferred to the weld filler material during the welding operation and appear in and modify the properties of the resultant weld, for example ferromanganese, ferrosilicon, ferrochromium, calcium molybdate, carbon or reducible chemical compounds thereof, and the like.

The particle size of the granulated welding composition employed may vary over wide ranges, the limits being determined by dimensions of powder passages of the equipment and the ability to disperse and suspend the powders in the carrier gas stream.

The shielding gas medium employed in the process of the invention may generally comprise any shielding gas heretofore employed in gas shielded metal arc welding, such as argon, helium, carbon dioxide, or mixtures thereof, with or without minor amounts of oxygen up to approximately 15%.

Similarly, the carrier gas medium employed in the process of the invention may generally comprise any gas heretofore used in gas shielded metal arc welding and may be identical with or differ from the composition of the shielding gas medium employed.

The average composition, by proximate analysis, of the granulated welding composition employed in the welding operations of the examples and table set forth hereinabove are as follows:

| | Percent |
|---|---|
| CaO+BaO | 22.5 |
| $CaF_2$ | 5.5 |
| $SiO_2$ | 37.5 |
| $Al_2O_3$ | 14.5 |
| MgO | 11.25 |
| MnO | 7.25 | where:

| | | |
|---|---|---|
| BaO | Max | 2.0 |

What is claimed is:

1. The process of electric arc welding of steel, wherein a steel electrode and workpiece are connected to a source of welding current, comprising feeding said electrode toward said workpiece to establish and maintain an arc and welding zone between said electrode and said workpiece; feeding an annular stream of shielding gas along such electrode around said arc and welding zone; coordinating relative movement between said electrode and workpiece while concurrently introducing a gas-borne stream of granulated slag-producing welding composition into said welding zone immediately behind said arc to flux and refine and further shield said welding zone; and coordinating the rate of said introduction of said welding composition with the rate of fusion of said electrode, characterized in that such introduction of granulated welding composition into the welding zone at a point immediately behind the arc substantially increases the metal transfer efficiency of the process, and makes possible the efficient use of either an A.C. or a S.P.-D.C. welding arc as well as a R.P.-D.C. welding arc in the process.

2. The process of electric arc welding of steel, wherein a steel electrode and workpiece are connected to a source of welding current, comprising feeding said electrode toward said workpiece to establish and maintain an arc and welding zone between said electrode and said workpiece; feeding an annular primary stream of shielding gas along such electrode around said arc and welding zone; coordinating relative movement between said electrode and workpiece while concurrently feeding a secondary gas stream bearing granulated slag-producing welding composition through said primary stream of shielding gas into said welding zone immediately behind said arc to flux and refine and further shield said welding zone; and coordinating the rate of said introduction of said welding composition with the rate of fusion of said electrode, characterized in that such introduction of granulated welding composition into the welding zone at a point immediately behind the arc substantially increases the metal transfer efficiency of the process, and makes possible the efficient use of either an A.C. or a S.P.-D.C. welding arc as well as a R.P.-D.C. welding arc in the process.

3. The process in accordance with claim 2, wherein said secondary gas stream bearing said granulated welding composition is of the same composition as said primary gas stream.

References Cited in the file of this patent

UNITED STATES PATENTS

| 1,553,543 | Lincoln | Sept. 15, 1925 |
| 1,963,729 | Alexay | June 19, 1934 |
| 2,473,600 | Lobosco | June 21, 1949 |
| 2,489,002 | Babbitt | Nov. 22, 1949 |
| 2,511,976 | Frost | June 20, 1950 |
| 2,710,902 | Pilia | June 14, 1955 |
| 2,727,125 | Muller | Dec. 13, 1955 |

FOREIGN PATENTS

| 472,363 | Great Britain | Sept. 22, 1937 |